US 11,148,966 B2

(12) United States Patent
Straatmans

(10) Patent No.: US 11,148,966 B2
(45) Date of Patent: Oct. 19, 2021

(54) APPARATUS AND METHOD FOR WASTE AND WATER TREATMENT

(71) Applicant: Tim Straatmans, Boyne Island (AU)

(72) Inventor: Tim Straatmans, Boyne Island (AU)

(73) Assignee: Straatmans Holding Company Pty Ltd ACN 102 598 729

( * ) Notice: Subject to any disclaimer, the term of this patent is extended or adjusted under 35 U.S.C. 154(b) by 418 days.

(21) Appl. No.: 16/073,511

(22) PCT Filed: Jan. 27, 2017

(86) PCT No.: PCT/AU2017/000012
§ 371 (c)(1),
(2) Date: Jul. 27, 2018

(87) PCT Pub. No.: WO2017/127866
PCT Pub. Date: Aug. 3, 2017

(65) Prior Publication Data
US 2019/0031547 A1    Jan. 31, 2019

(30) Foreign Application Priority Data

Jan. 28, 2016 (AU) .................................. 2016900257

(51) Int. Cl.
*C02F 11/122* (2019.01)
*C02F 1/00* (2006.01)
(Continued)

(52) U.S. Cl.
CPC ............ *C02F 11/122* (2013.01); *B01D 29/96* (2013.01); *B01D 37/03* (2013.01); *C02F 1/004* (2013.01);
(Continued)

(58) Field of Classification Search
CPC .................................................. C02F 11/122
See application file for complete search history.

(56) References Cited

U.S. PATENT DOCUMENTS

| 3,796,316 A | 3/1974 | Matz |
| 8,070,960 B2 | 12/2011 | Conwell |
| 2003/0042194 A1 | 3/2003 | Turchetti |

FOREIGN PATENT DOCUMENTS

| CN | 203123645 U | 8/2013 |
| DE | 102007012455 A1 | 9/2008 |

(Continued)

OTHER PUBLICATIONS

International Search Report for Application No. PCT/AU2017/000012 dated Jun. 1, 2017.
(Continued)

*Primary Examiner* — Peter Keyworth
(74) *Attorney, Agent, or Firm* — Lerner, David, Littenberg, Krumholz & Mentlik, LLP

(57) ABSTRACT

An apparatus for recovering the suspended particles from waste water comprising a tank (10) having an upper section (14) for receiving waste water, a lower chamber (16) and a base plate (18) separating the upper section (14) and the lower chamber (18). In one aspect the base plate is a filter screen that has a central opening (20) and a closure 28 therefore. The apparatus has a filter press plate (24) within the upper section (14) and is moveable between a non-filtering position spaced away from the base plate (18) and a filtering position in which the filter member (24) and base plate (18) are pressed together so as to separate water from the particles and compress the particles to form a substantially dewatered product that can then pass through the opening (20) into the lower chamber (16) for collection.

19 Claims, 8 Drawing Sheets

(51) Int. Cl.
    *C02F 1/28*      (2006.01)
    *C02F 1/52*      (2006.01)
    *C02F 1/56*      (2006.01)
    *B01D 29/96*     (2006.01)
    *B01D 37/03*     (2006.01)
    *C02F 103/10*    (2006.01)
    *C02F 103/32*    (2006.01)
    *C02F 103/20*    (2006.01)

(52) U.S. Cl.
    CPC ............ *C02F 1/281* (2013.01); *C02F 1/5245* (2013.01); *C02F 1/56* (2013.01); *C02F 2103/10* (2013.01); *C02F 2103/20* (2013.01); *C02F 2103/32* (2013.01)

(56) References Cited

FOREIGN PATENT DOCUMENTS

| | | |
|---|---|---|
| EP | 1967657 A2 | 9/2008 |
| JP | S63230300 A | 9/1988 |
| WO | 2008117396 A1 | 10/2008 |

OTHER PUBLICATIONS

Extended European Search Report including Written Opinion for Application No. EP17743468.5 dated Jul. 2, 2019, pp. 1-9.

APPARATUS AND METHOD FOR WASTE AND WATER TREATMENT

CROSS-REFERENCE TO RELATED APPLICATIONS

The present application is a national phase entry under 35 U.S.C. § 371 of International Application No. PCT/AU2017/000012 filed Jan. 27, 2017, which claims priority from Australian Patent Application No. 2016900257 filed Jan. 28, 2016, all of which are incorporated herein by reference.

FIELD

The present disclosure relates to an apparatus and method for treating wastewater. The present disclosure in particular relates to an apparatus and methods for removing suspended particles from water. In one aspect, the removed particles may be in a substantially dewatered solid form that is suitable for dry bulk material handling.

BACKGROUND

Waste water is any water that has been adversely affected in quality by human influence. Waste water can originate from a combination of domestic, industrial, commercial, mining or agricultural activities, surface runoff or stormwater, and from sewer inflow or infiltration. In some activities, and in particular mining, the wastewater that is generated may still contain valuable materials. However, as these materials are in the form of suspended fines, it is not currently possible to economically recover and process these materials.

The present apparatus and method is disclosed with particular reference to the treatment of industrial and mining waste. This is by way of convenient example only. It will be appreciated that the disclosed apparatus and methods have broader application and no limitation is intended thereby. Examples of other applications include effluent from food processing, or animal husbandry in which case the recovered solids may find use as fertiliser.

Tailings are the materials left over after the process of settling the valuable fraction from the uneconomic fraction (gangue) of an ore. Tailings consist of ground rock and process effluents that are generated in a mine processing plant. Mechanical and chemical processes are used to extract the desired product from the run of the mine ore and produce the tailings. This process of product extraction is never 100% efficient, nor is it possible to reclaim all reusable and expended processing reagents and chemicals. The unrecoverable and uneconomic metals, minerals, chemicals, organics and process water are discharged, normally as slurry, to a final storage area.

Tailings have no financial gain to a mineral operator at that particular point in time so that the final storage area is generally chosen to be the most cost effective way possible to meet regulations and site specific factors. Dams, embankments and other types of surface impoundments are by far the most common storage methods used today and remain of primary importance in tailings disposal planning. The particular design of these retaining structures is unique to a particular environment and mineral processing operation.

Generally tailings or other effluents are treated in some way prior to discharge to a tailings dam. The main purpose of this treatment is to be able to reduce the level of contaminants in the water so that it may be recycled to the processing plant or returned to the environment. The waste that is left after water removal is in the form of a thickened sludge is generally pumped to the final storage area. In the storage area, dewatering of the sludge can occur by gravity consolidation and evaporation in a process that takes in the order of about 2 years or more.

The disposal of tailings is commonly identified as the single most important source of environmental impact for many mining operations. This is not surprising when considering that the volume of tailings requiring storage can often exceed the in-situ total volume of the ore being mined and processed. Over the last century, the volume of tailings being generated has grown dramatically as the demand for minerals and metals has increased and lower grades of ore are being mined through advances in extraction and processing technology.

Considerable research has been conducted in an attempt to solve this problem. To date, no effective and commercially viable solution has been found.

One important example is red mud that is a waste product from bauxite processing that produces aluminium. It is estimated that approximately 77 million tons of red mud are produced annually. Red mud cannot be disposed of easily. In most countries where red mud is produced, it is pumped into holding ponds. Red mud presents a problem as it takes up land area and can neither be built on nor farmed, even when the mud is dry. One challenge is that drying the mud requires considerable energy. Research is therefore being performed to find uses for red mud. One potential application includes the production of low cost concrete.

Another example of a problematic effluent is the tailings from the mining of sulfidic minerals contain large amounts of pyrite ($FeS_2$) and pyrotite (FeS), which are rejected from the sought-after ores of copper and nickel, as well as coal. Although harmless underground, these minerals are reactive toward air in the presence of microorganisms, leading to acid mine drainage.

In coal mining, a sizeable amount of coal ends up being lost in tailings dam as refuse. While there are a number of methods proposed to extract the value from tailings and run off, such as employing mobile machinery or dredging equipment, they have serious limitations.

In some applications, such as when water is used for cleaning, vehicles, machinery and the like, the suspended particles may be of no value. In such cases, it is generally still desirable to remove the particles to clarify the water. The clarified water may be recycled or is of a quality that can be returned to the environment.

It will be appreciated that there is a desire to provide an alternative method of waste water/effluent treatment.

DEFINITION

In the present description and claims, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

SUMMARY

According to a first aspect of the disclosure there is provided an apparatus for removing suspended waste particles from waste water and recovering the waste particles as a substantially dewatered solid, the apparatus comprising:

a tank having an upper section for receiving waste water, a lower chamber and a base plate separating the upper section and the lower chamber, the base plate having an opening therein;

a closure moveable between a position in which the base plate opening is closed and a position in which the base plate opening is open;

a filter member within the upper section, wherein;

one of the filter member and the base plate have filter openings through which water can pass through but suspended particles cannot pass;

the filter member and base plate are moveable with respect to each other between a non-filtering position in which the filter member is spaced away from the base plate so as to define an upper chamber between the filter member and the base plate and a filtering position in which the filter member and base plate are pressed together with the closure in the closed position such that suspended waste particles are compressed between the filter member and the base plate to form a substantially dewatered product comprising the previously suspended particles and water passes through the filter openings in the filter member or the base plate; and when the filter member is returned to the non-filtering position, the closure in the base plate is moveable to the open position such that the substantially dewatered product can pass through the opening into the lower chamber for collection.

The tank may be of any suitable shape, size, material and/or configuration that may depend upon the volume and nature of the waste water to be treated and/or the waste that is separated therefrom.

The waste water to be treated may be any type of waste water. Typically the waste water is from a tailings dam from mining or mineral processing.

The tank is separated into an upper section and a lower chamber by a base plate having an opening therein.

Suitably, the tank has a circular cross section and the opening in the base plate is circular and coaxial with the tank.

Suitably the base plate has an inverse frustoconical shape such that it tapers downwards towards the opening so as to facilitate the passage of dewatered product therethrough.

The opening is suitably dimensioned so as to allow quick and efficient passage of dewatered product into the lower chamber. Suitably the opening is circular and has a diameter that is between about 10% to about 60%, suitably about 20% to about 50%, suitably between 25% and 45% of the diameter of the tank.

The apparatus includes a closure that is movable between an open and a closed position so as to open and close the opening in the base plate.

Suitably, the closure is in the form of a plug in that it extends at least partially through the opening. The plug suitably has a conical upper section, which when the plug is in the closed position, the conical upper section of the plug projects upwards into the upper section.

Suitably the closure is moved vertically upwardly from the closed to the open position and moved downwardly from the open to the closed position.

The apparatus further includes a filter member. The base plate and filter member are moveable with respect to each other between a non-filtering and filtering position. That is, either the filter member or the base plate may be stationary and the other of the base plate or filter member may be moveable.

Suitably, the base plate is stationary and the filter member moves.

Alternatively, both the filter member and base plate may move with respect to each other.

The shape of the filter member is suitably complementary to the base plate. In the aspect in which the base plate is tapered downwards and the closure is a cone shaped plug, the filter member will have a complimentary shape to the base plate and closure together. That is the filter member has an upper frustoconical section complimentary to the base plate and an inner conical section that is complimentary to the upper surface of the closure. Such an arrangement increases the surface area for filtering compared to planar surfaces.

However, other filter shapes may of course be used, including a flat filter surface, depending upon the nature, type and volume of the waste water and waste that is to be separated.

The filter member may be a filter screen, in which case, the base plate operates as a filter press plate and when the filter screen and base plate are compressed together the water is pressed out through the filter screen into the upper chamber where it can be removed by suitable means.

Alternatively and more suitably, the filter member may be a filter press plate and the base plate has openings so that the base plate operates as a filter screen such that when filtration is occurring, water is pressed out through the base plate into the lower chamber. This will be described further below.

The suspended particles are recovered as a substantially dewatered product. By substantially dewatered, it is meant that the collected waste is in a form that can be handled by dry material handling equipment as compared to a liquid sludge, slurry or the like that must be pumped or otherwise handled.

It will be appreciated that residual water may be tolerated, provided the product can be handled as a dry solid. Suitable residual water levels may depend upon the nature of the product. Residual water levels of up to 20%, suitably 10% suitably 8%, suitably 7%, suitably 6%, suitably 5%, suitably 4% suitably 3% suitably 2% may be tolerated.

Suitably, the product is in the form of a filter cake formed as a result of the pressure applied during filtration when the filter member and base plate are pressed together.

In the embodiment in which the filter member operates as a filter press plate, the lower surface of the filter member suitably has a plurality of voids that causes the particles to form discrete filter cakes that may be granules, pellets, briquettes or the like. The size of the filter cakes suitably depend upon the end use, disposal or storage of the waste and/or handling or transportation requirements.

Suitably, the filter member is vibrated during the filtering process so as to facilitate the settled particles entering or being guided into the voids.

Suitably, the waste particles are forced into the voids under sufficient pressure such that the formed filter cake is retained within the voids as the filter member and base plate are separated at the end of the filtering process. This can facilitate collection of the filter cake as will be described with reference to the detailed description below.

In the embodiment in which the filter member is a filter press plate, the assembly may further include at least one smaller chamber or hopper mounted to the top surface of the filter member and in fluid communication with the lower surface of the filter member. When the filter member and base plate are pressed together, any excess particles may be received within the chamber or chambers. The at least one excess particle chamber may be internally pressured should further dewatering of the filtered waste be required.

The excess filtered particles retained in the chamber(s) are released back into the upper chamber in the next mixing cycle.

The or each excess particle chamber may also be provided with means for pressurizing the excess so as to exert further pressure on the solids so as to facilitate filling of the voids in the filter press plate, where present.

In one aspect, there may be a single excess chamber for receiving excess material.

The filter member and closure may be operatively connected together such that a single lifting and lowering arrangement can be used to lift and lower each of the filter screen and closure.

An example of how such operative connection may be achieved by providing a connector between the filter member and closure in such a way that the filter member is able to move relative to the closure when the closure is in the closed position and attaching a lifting/lowering mechanism to the top of the filter member. This allows the filter member to be lowered towards the filtering position when the closure is in place.

In one aspect, the connector may be a tube or arm that is slidably received within the closure, having an upper end that is connected to the lower face of the filter member and has a lower end that projects below the lower surface of the closure and the lower end has a stop that prevents the lower end from passing through the closure when the filter member is being lifted.

It will be appreciated that during lifting when the stop is stopped by the lower surface of the closure, the lifting mechanism will then lift the filter member and closure together.

In another aspect, the connector is a tube that drives an agitator. Internal to the tube is a shaft that holds the plug. The shaft is free of the tube, so the tube can spin, whilst the internal shaft remains stationary.

Alternatively or in addition to, the connector may be in the form of an inlet for waste water to be delivered into the upper chamber. The waste water may be delivered through jets or orifices under pressure so as to facilitate mixing even further.

Suitably the mixing may create a vortex. This may be important for proper mixing of a settling agent if used as discussed below When the filter member is returned to the non-filtering position and the closure is moved to the open position, dewatered solid product can pass through the opening into the lower chamber for collection.

Collection of the dewatered solid product may by any suitable means.

In one aspect, the apparatus may include a collection unit locatable within the lower chamber for collecting the product. Suitably, the collection unit is a collection bin, bag or other suitable receptacle that can be located within the lower chamber to collect the product and can be removed from the lower chamber for transport for further disposal, processing or other end use as desired.

Alternatively, product collection may be by means of a chute or conveyer that can transfer product as it passes through the opening onto the chute or conveyer, onto the chute or conveyer for transfer out of the lower chamber.

Alternatively, the lower chamber may include an access opening for machinery or persons to enter to collect dewatered product.

In a further alternative arrangement, the lower chamber may have a hole in the bottom thereof for product collection.

A waste collection unit may itself be connected to the lower surface of the closure such that in use the filter member, closure and waste collection unit can be raised and lowered together.

In this arrangement, after filtration has been completed, the filter member and retained filter cake units are raised, the closure is moved to the open position.

The filter cake units will then fall from the filter member onto the base plate. Suitably the filter member may be agitated so as to facilitate release of the filter cake units. Other methods of facilitating release may be used alternatively or in addition to agitation.

In the embodiment where the base plate tapers downwards towards the opening, filter cake units may be directed towards the opening through gravity. However, for some materials, the some of the filter cake units may become stuck on the base plate. The apparatus may therefore include an air supply that operates to dislodge retained filter cake units by directing a source of pressurized air upwardly through the openings in the base plate.

When the filter cake units have been collected in a collection unit, the collection unit and collected waste can then be removed from the apparatus in a bagged and transportable form for transport to another location for further processing, disposal or other desired use.

In the aspect where a collection unit, closure and filter member are all connected together, the entire assembly may be lifted out of the tank, moved sideways and lowered so that the filled collection unit may be received and removed from the assembly.

A fresh collection unit may then be attached to the assembly, which is then returned to the position with the closure in the closed position, the collection unit located within the lower chamber and the filter member located above or near the top of the upper chamber.

In the aspect in which the base plate operates as a filter screen, through which water passes through during filtering the lower chamber may be divided into an inner dry chamber directly below and in communication with the opening into which the substantially dewatered product passes and an outer wet chamber below that is in fluid communication with the apertures in the base plate for receiving filtered water.

The dry chamber may remain sealed by the closure until the water has been transferred to the wet chamber. Suitably the filtered water is then discharged to a holding tank and the water quality assessed. The water may be discharged into the environment or in the case of industrial or mining waste, recycled.

Suitably, the suspended particles are allowed to settle in the upper section prior to filtration. Suitably coagulating, flocculating or clarifying agents are added as per known water treatment processes so as to coagulate particles so that they settle quickly.

In the aspect where the base plate has openings through which water passes during filtration, the apparatus suitably includes a sealing member for the base plate apertures that can move between a closed position during the filling and mixing steps and an open position during the filtration step. Suitably the sealing member is biased towards the closed position and this bias is overcome in response to may be responsive to an increase in pressure that occurs by the water pressure created during filtration when the water is being forced through the openings by the action of the filter member.

Suitably, a settling agent is introduced into the waste water either before and/or after the waste water is charged to the upper section.

The term "settling agent" means any agent that can cause the suspended particles to agglomerate, coagulate, flocculate so that they can settle out from the water in a form that can be filtered and compressed.

Generally agitation is required to mix the settling agent with the suspended particles for optimum aggregation to occur. Suitably the upper chamber includes an agitator for mixing the settling agent. In this case, the upper chamber operates as a mixing chamber.

In many cases, the waste water may also require a pre-treatment step such as pH adjustment prior to addition of the settling agent. Generally settling agents have an optimum pH.

A pretreatment agent may be added to the waste water before or after the waste water is charged to the upper section.

In one aspect the upper section includes a further chamber that is a pretreatment chamber above the upper chamber. In this embodiment, the upper section has an upper pretreatment chamber and a lower mixing chamber.

In this aspect, waste water is charged to the pretreatment chamber and a pretreatment agent such as a pH adjusting agent is added and mixed with the waste water. When the waste water has reached a desired pretreatment value, such as a desired pH, the waste water is then charged to the mixing chamber for mixing with the settling agent to activate the interaction between the settling agent and the suspended particles.

Alternatively, the settling agent may be introduced into the pre-treatment chamber. In this case, any mixing in the pre-treatment chamber would be insufficient to activate any significant interaction between the settling agent and the suspended particles.

An advantage of a separate pretreatment chamber above the mixing chamber is that the waste water is gravity fed from the pretreatment chamber to the mixing chamber, thereby avoiding the use of pumps and the like that introduces additional initial cost and requires maintenance.

Another advantage is that a charge of waste water may be pretreated in the pretreatment chamber whilst a second charge may be mixed and filtered in the mixing chamber. This allows the throughput of the apparatus to be increased as it reduces or avoids pretreating the waste water in the filtration chamber.

According to another aspect of the disclosure there is provided a method for removing suspended waste particles from waste water and recovering the waste particles as a substantially dewatered product, the method comprising:

providing a tank having an upper section for receiving waste water, a lower chamber and a base plate separating the upper section and the lower chamber, the base plate having an opening therein;

a closure moveable between a position in which the base plate opening is closed and a position in which the base plate opening is open;

a filter member within the upper section, wherein;

one of the filter member and the base plate have filter openings through which water can pass through but suspended particles cannot pass;

the filter member and base plate are moveable with respect to each other between a non-filtering position in which the filter member is spaced away from the base plate so as to define an upper chamber between the filter member and the base plate and a filtering position in which the filter member and base plate are pressed together with the closure in the closed position such that suspended waste particles are compressed between the filter member and the base plate to form a substantially dewatered product comprising the previously suspended particles and water passes through the filter openings in the filter member or the base plate; and when the filter member is returned to the non-filtering position, the closure in the base plate is moveable to the open position such that the substantially dewatered product can pass through the opening into the lower chamber for collection;

charging the upper section with the waste water with the closure in the closed position and the filter member in the non-filtering position;

allowing the suspended particles to settle;

moving the filter member and/or base plate into the filtering position such that the waste particles are compressed between the filter member and the base plate so as to provide a substantially dewatered product;

returning the filter screen and/or base plate to the non-filtering position; and moving the closure into the open position so that the substantially dewatered product can pass through the opening into the lower chamber.

An advantage of the apparatus and method is that the waste water can be treated, and the suspended particles substantially dewatered using a single apparatus in a continuous method. This can offer considerable savings in infrastructure, time and handling.

In a waste treatment system that uses the apparatus and method as disclosed, the system would suitably include two or more units. If there is a unit partial failure for whatever reason, the entire process does not cease. Secondly modularised allows in different circumstances, a clean-up facilitation, whereas units may be provided and used on a temporary basis.

However, there are some forms of wastes, and in particular those that are suspensions of fine particulates with particle sizes of less than about 300 μm, typically less than about 200 μm and less than 100 μm that when treated with a flocculent form large and porous flocs that have poor dewatering characteristics. Examples of such wastes include but are not limited to red mud, coal fines and fly ash.

It is generally desirable that a settling agent acts quickly. To settle quickly requires the formation of large flocs. However large flocs that are formed quickly tend to be porous and therefore have poor dewatering characteristics and cannot be dewatered efficiently or at all. This trade off may be tolerated where the aim is to clarify the water as quickly as possible. The large porous flocs end up as a sludge or slurry and if dewatered in for example a filter press, the resulting product is still a sludge or slurry but of reduced water content.

For example, the use of flocculants in the Bayer process to separate the suspended solids from the aluminum containing liquor is well known. Starch was originally used as a flocculent. The use of starch has been replaced by polyacrylate polymers. It is important that the removal of the suspended particulates in a Bayer liquor occurs quickly and efficiently. The more effective the flocculent is, the greater the potential for increased aluminium recovery, reduction in valuable soda losses, and minimization of negative downstream effects. However, as mentioned above, the resulting flocs have poor dewatering properties.

The present inventor has surprisingly discovered that a composition that is primarily used for settling oils from waste water is not only able to cause fast settling of fine particulates but the resulting floc also has good dewatering properties.

Such a discovery is of considerable importance in addressing the significant problems for the handling of fine particle waste products such as red mud, cola fines and fly ash.

The composition comprises about 43.7 wt % to about 46.2 wt % of a colloidal clay that is bentonite, about 24.1 wt % to about 25.9 wt % of an inorganic coagulant in the form of $Al_2(SO_4)_3$, about 19.2 wt % to about 20.8 wt % of a water purifier in the form of ceramic powder, about 4.8 wt % to about 5.2 wt % of a cationic polymeric coagulant aid in the form of chitosan and about 4.8 wt % to about 5.2% of an inorganic coagulant aid in the form of $CaCO_3$.

It will be appreciated by those in the water treatment arts that water treatment agents that have the same or similar physical and chemical properties may be used in different circumstances depending upon the chemical and physical properties of the waste, pH, amount of suspended solids, desired properties of the dewatered waste. The latter may depend upon the end use requirements of the dewatered waste. The physical and chemical properties of individual wastes for example mining waste can also depend upon individual mine sites given the geographical variance in base ore.

According to a further aspect therefore, the settling agent is a composition comprising between about 40 wt % to about 50 wt % of a colloidal clay, between about 20 wt % to about 30 wt % of an inorganic coagulant, between about 15 wt % to about 25 wt % of an adsorbent silicate, between about 3 wt % to about 10 wt % of a cationic polymeric coagulant aid and between about 3 wt % to about 10 wt % of an inorganic coagulant aid.

The colloidal clay may include bentonite, saponite, attapulgite or kaolinite.

Inorganic coagulants are suitably inorganic salts of aluminium or iron. These inorganic salts neutralize the charge on suspended particles and also hydrolyse to form insoluble precipitates, which entrap particles. Exemplary inorganic coagulants include aluminium sulfate $(Al_2SO_4)_3$, aluminium chloride $(AlCl_3.6H_2O)$, ferric sulfate $(Fe_2(SO_4)_3)$, ferric-floc $(Fe_2(SO_4)_3.9H_2O)$, ferric chloride $(FeCl_3)$ and sodium aluminate $(Na_2Al_2O_4)$.

The adsorbent silicate may include magnesium silicate $(Mg_3Si_4O_{10}(OH)_2)$, magnesium aluminum silicate $(AlMgO_4Si+)$, calcium silicate $(Ca_2O_4Si)$, sodium silicates $(Na_2(SiO_2)_nO)$ and silica gel.

The cationic polymeric coagulant aid may be natural or synthetic. Exemplary synthetic cationic polymers include epichlorohydrin dimethylamine, aminomethyl polyacrylamide, polyalkylene, polyamines and polyethyleneimine. Suitable natural polymers include sodium alginate, starch and chitosan.

The settling agent is suitably introduced to the waste water as a suspension. Suitably the mixture is subject to agitation The optimum pH for this composition is between about 6.5 to about 12, suitably between about 7 to about 10.

It may be necessary in some applications to modify the pH of the waste water. This may involve the addition of acid or alkali as required.

It will be appreciated that use of this composition is not limited to the disclosed apparatus and the composition may be used with conventional waste water treatment processes such as a clarifier fluidly connected to a filter screen for producing briquettes.

Red mud is suitably formed into briquettes for further processing so as to recover the metals therein. Red mud can comprise silica, aluminum, iron, calcium, and optionally titanium. It can also comprise an array of minor constituents such as Na, K, Cr, V, Ni, Co, Ba, Cu, Mn, Mg, Pb, and/or Zn etc. Red mud typically comprises about 30 to about 65% by weight of $Fe_2O_3$, about 10 to about 20% by weight $Al_2O_3$, about 3 to about 50% by weight of $SiO_2$, about 2 to about 10% by weight of $Na_2O$, about 2 to about 8% by weight of CaO, and from 0 to about 25% by weight of $TiO_2$. The person skilled in the art will understand that the composition of red mud can vary depending on the bauxite origin used in the Bayer process.

An example of such further processing is known as the Orbite process that is described in Canadian patent 2,857,574 and U.S. patent application Ser. No. 14/371,364. In the Orbite process, red mud is leached with HCl so as to obtain a leachate comprising aluminium ions and a solid, and settling the solid from said leachate. Several other metals can be extracted from the leachate (Fe, Ni, Co, Mg, rare earth elements, rare metals, etc.). Various other components can also be extracted from solid such as $TiO_2$, $SiO_2$ etc.

Also disclosed herein is a method of recovering suspended particulate waste fines from waste water in the form of a substantially dewatered solid product, the method comprising mixing the waste with an effective amount of a composition comprising between about 40 wt % to about 50 wt % of a colloidal clay, between about 20 wt % to about 30 wt % of an inorganic coagulant, between about 15 wt % to about 25 wt % of an adsorbent silicate, between about 3 wt % to about 10 wt % of a cationic polymeric coagulant aid and between about 3 wt % to about 10 wt % of an inorganic coagulant aid such so as to cause aggregations of the suspended fines allowing the aggregates to settle, filtering the waste water under pressure so as to compress and substantially dewater the aggregated fines to form a substantially dewatered solid product.

The method may suitably be used with the disclosed apparatus. However, this is not necessary.

The apparatus and method are suitably configured for remote monitoring and control. One control system that may be suitable is SCADA (supervisory control and data acquisition).

DETAILED DESCRIPTION OF THE FIGURES

Figure 1:
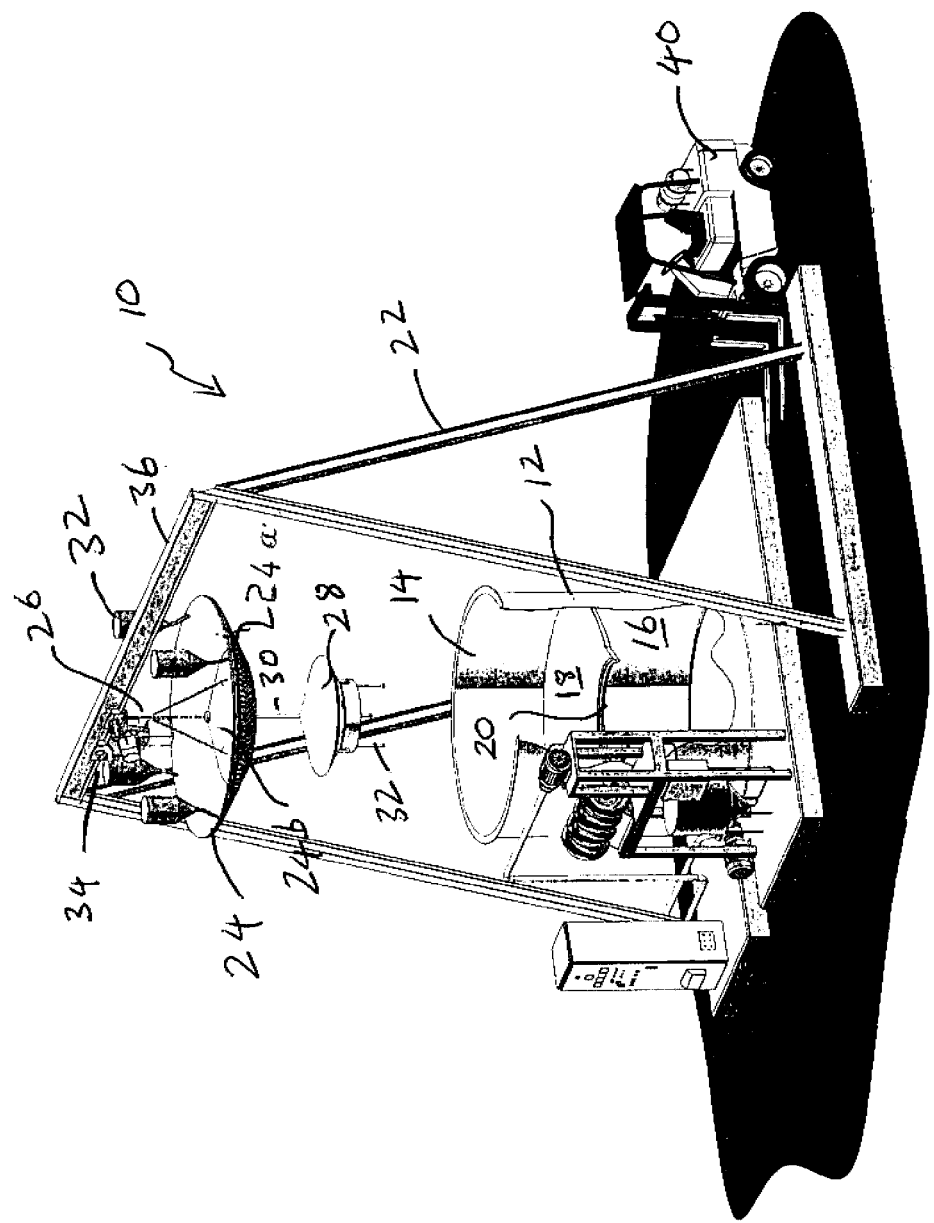
FIG. 1 is a schematic view of one aspect of the disclosed apparatus in which the filter screen is in the raised position.

FIG. 1 shows an apparatus 10 as disclosed. The apparatus 10 has a tank 12 that has an upper section 14 and a lower chamber 16 separated by a circular base plate 18. The base plate 18 tapers downwards towards a central co-axial circular opening 20.

The apparatus 10 is includes a gantry 22. A filter press plate 24 is suspended from the gantry 22 by a chain 26. The filter press plate 24 has an outer frustoconical section 24a that is complimentary to the base plate 18 and an inner conical section 24b.

Suspended below the filter press plate 24 by arm 30 is a conical closure or plug 28. The plug is dimensioned to seal the opening 20. The cone shape of the plug 28 is complimentary to the shape of the inner part 24b of the filter press plate 24.

Three arms 32 extend below plug 28. These arms support a collection bag (not shown).

The chain 26 is fixed to a hoist 34 for raising and lowering the filter press plate, 24, plug 28 and collection bag together.

Figure 2:
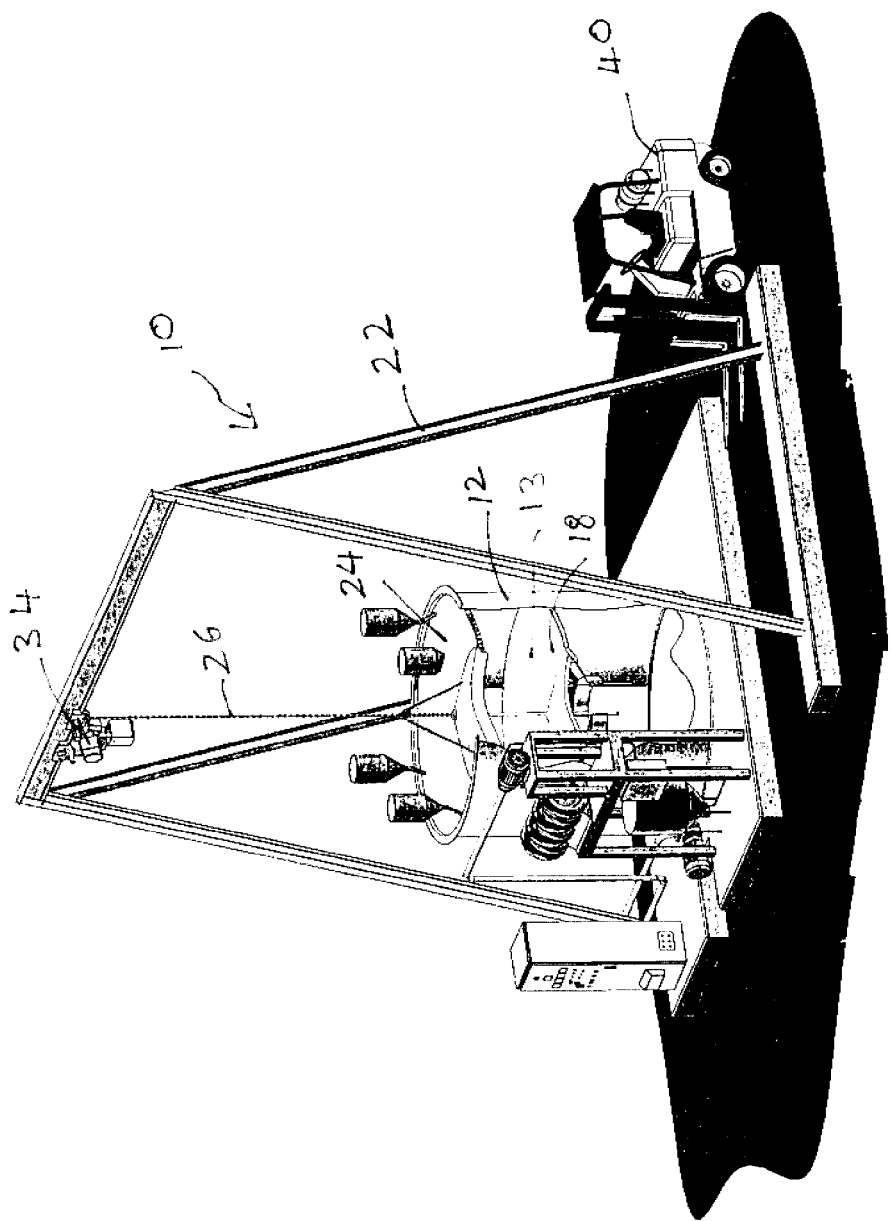
FIG. 2 shows the apparatus as shown in FIG. 1 in the mixing position.

FIG. 2 shows the apparatus 10 in the mixing configuration in which the filter press plate 24, plug 28 and collection bag have been lowered by the hoist 34 into a position in which the filter press plate 24 seals against the tank 12 and the plug 28 seals the opening 20 in base plate 18. A mixing chamber 13 is defined between the filter press plate 24 and the base plate 18. In this position, the waste water may be charged to the mixing chamber and mixed with a settling agent.

When used to treat a red mud slurry, the red mud is suitably pretreated to reduce the pH. Red mud has a high pH of about 14 and one known method of treating red mud to reduce the pH of to about 8-10 is to mix the red mud with seawater in a neutralizer. In this case, red mud will suitably be pumped from the neutralizer at a rate of about 5000 liters per hour in a pipe line. The slurry will typically contain about 10 vol % to about 20 vol % suspended red mud particles. A settling agent may be introduced into the pipe line so as to facilitate mixing of the agent with the feed stock. The pipeline includes means for interrupting the flow and creating agitation to facilitate mixing.

The settling agent comprises 43.7 wt %-46.2 wt % bentonite, 24.1 wt %-25.9 wt % $Al_2(SO_4)_3$, 19.2 wt %-20.8 wt % ceramic powder, 4.8 wt %-5.2 wt % chitosan and 4.8 wt %-5.2 wt % $CaCO_3$ as a suspension in water.

Upon entering the mixing chamber 13, the red mud slurry will be further diluted with sea water (about 2000 liters). The pH will be adjusted with hydrochloric acid to a pH of about 7.3. Further settling agent may be added to provide an effective amount and is further mixed with the slurry. Agitation may occur by any suitable mixing method known in the arts. However, high pressure water jets are particularly suitable. Mixing continues for about 5 minutes, after which time, the floc begins to settle very quickly.

Figure 3:
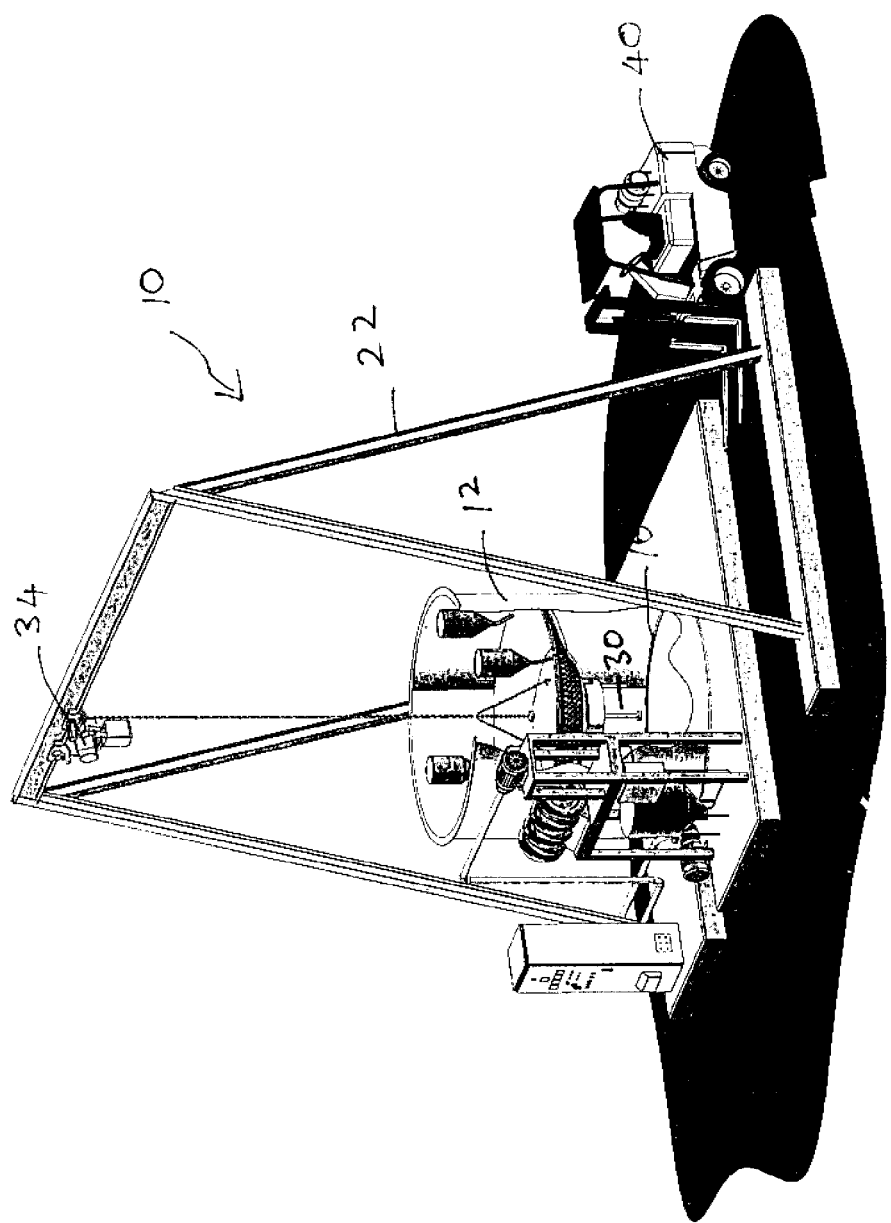
FIG. 3 shows the apparatus of FIG. 1 in the filtering position.

After settling, the filter press plate 24 will be lowered to the filtering position shown in FIG. 3. Arm 30 is slidably received within plug 28 so that the filter screen can be lowered whilst the plug 28 maintains the seal against the opening 20.

The lower face of the filter press plate 24 is profiled to define a plurality of voids dimensioned to correspond to standard briquette sizes for material handling. The water will be squeezed through the filter press plate 24 and the floc is compressed into the voids. The filter press plate 24 may be vibrated during pressing so as to ensure maximum floc is pressed into the voids. Water is forced under pressure through mesh lined apertures in the base plate 18.

It may be appreciated that the complimentary configuration of the inner 24b and outer 24a and outer parts of the filter press plate with the plug 28 and base plate 18 allows for optimization of pressure and an increase in surface area when compared with a flat filter press plate cooperating against a flat surface.

The apparatus 10 also includes four small hoppers 32 fluidly connected to the upper surface of the outer 24a part of the filter press plate 24. The hoppers 32 have a pressurized non-return valve. The pressure will be set so that the floc is pressurized to fill the voids. When this pressure is reached excess floc can enter the hoppers.

When the filtering process is over, the filter press plate 24 and plug 28 will be lifted by the hoist 34 to open the opening 20.

The filtered water that has passed through the mesh into the lower chamber 16 may be pumped to a temporary storage tank. Typically the water is quality tested and may be subject to further treatment. The water may then be released to the environment or recycled back to the filtering process.

The recycled water may be added to the settling agent that is in powdered form for introduction to a new batch of slurry. This may be advantageous if there is excess settling agent present in the filtered water as less settling agent will be required for the next cycle.

The pressed briquettes can then fall out of the voids in the filter press plate 24 and be collected in the collection bag. Some vibration of the filter press plate 24 may be introduced to facilitate release of the briquettes.

The entire filter press plate 24, plug 28, collection bag assembly is then lifted out of the tank 12 to the position shown in FIG. 1. The assembly is then moved sideways along the upper beam 36 of gantry 22 and then lowered so that the collection bag may be collected by a forklift 40 or other suitable material handling vehicle.

The entire process may be under automatic control so that the only manual intervention is collection and replacement of the collection bags.

The collected briquettes may be transported to a facility where any valuable mineral or other material may be reclaimed.

Figure 4:
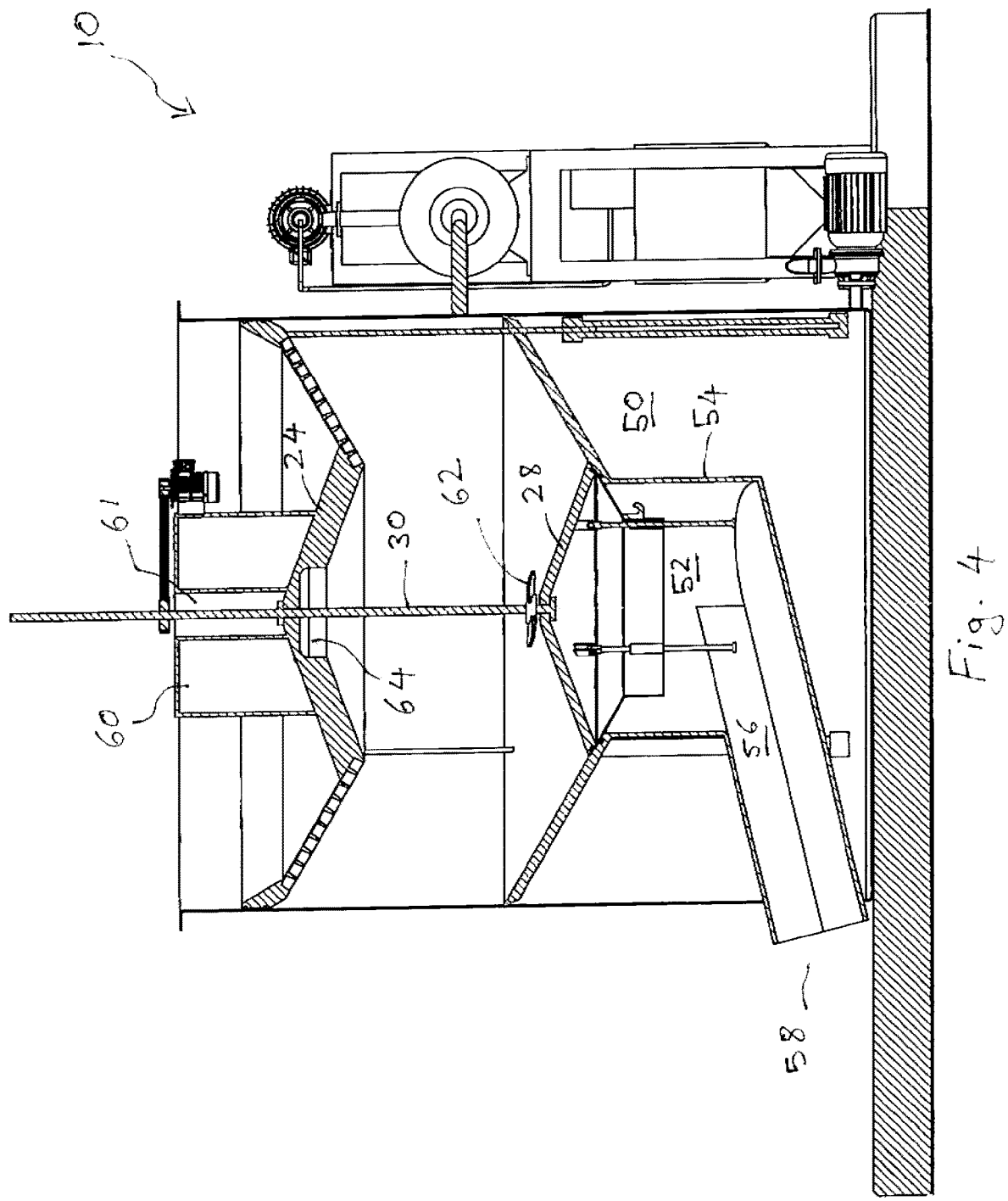
FIG. 4 is a schematic view of another aspect of the disclosed apparatus in which the filter screen is in the raised position.
Figure 5:
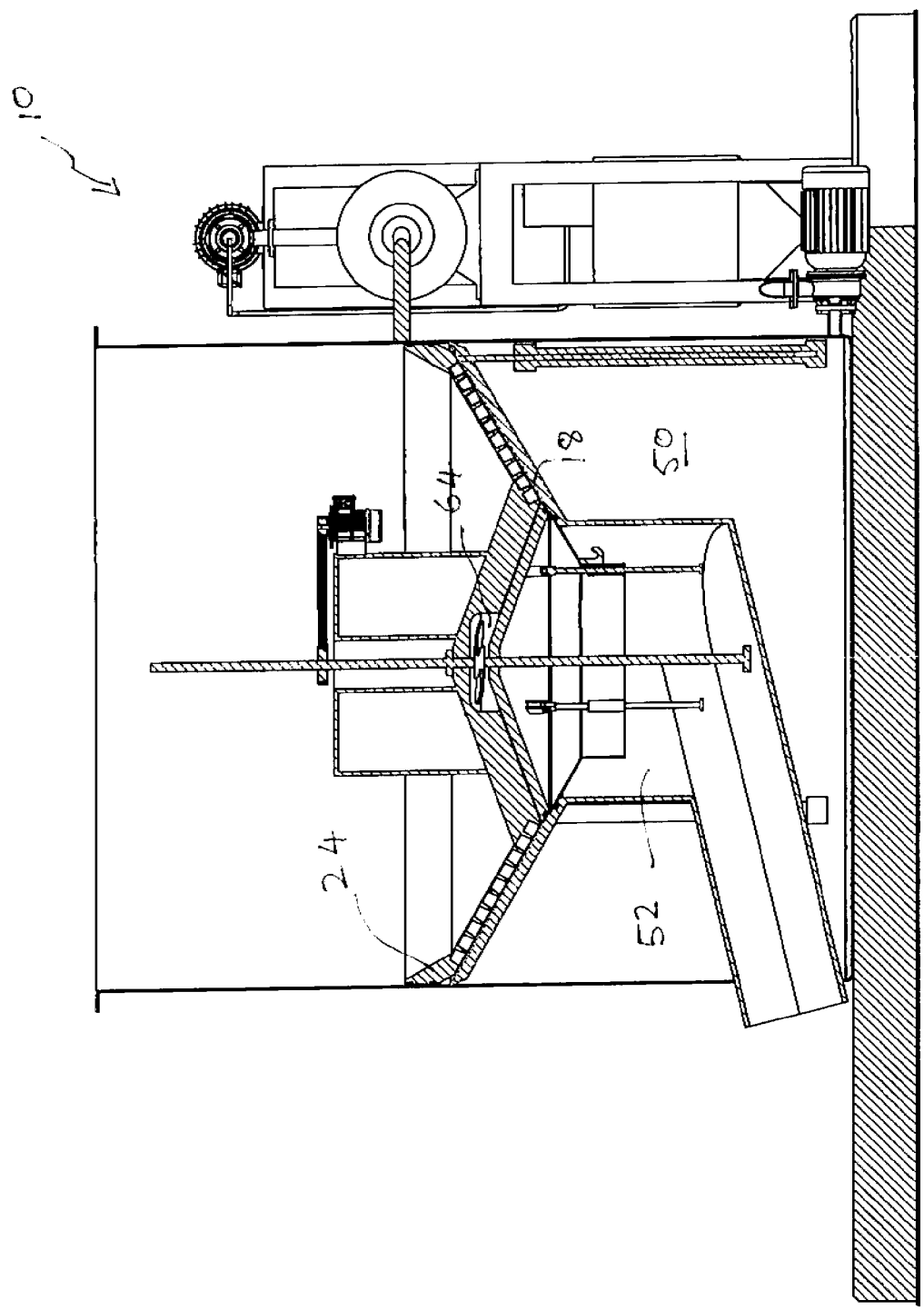
FIG. 5 shows the apparatus as shown in FIG. 4 in the mixing position.
Figure 6:
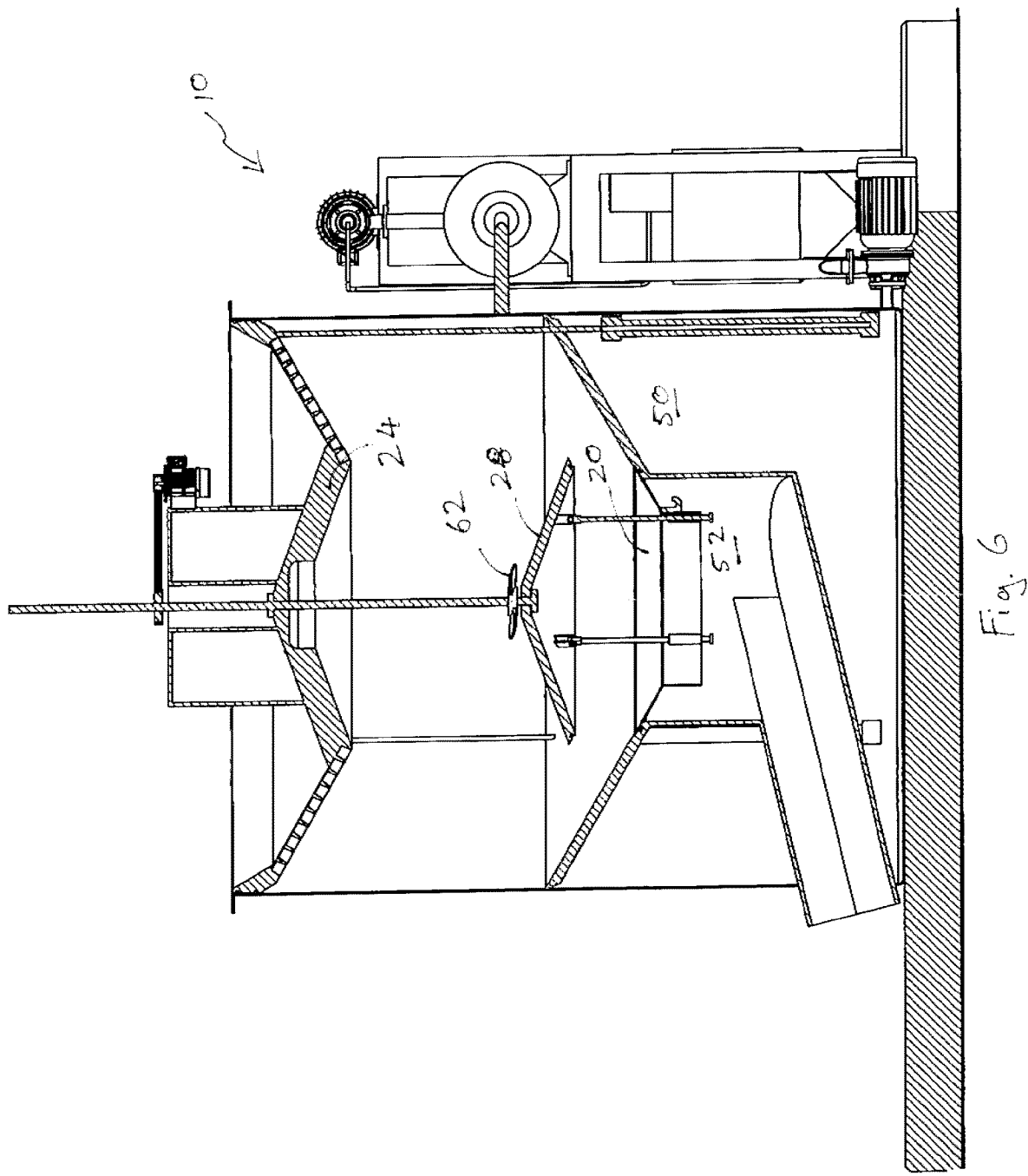
FIG. 6 shows the apparatus of FIG. 4 in the filtering position.

FIGS. 4 to 6 show an alternative apparatus as disclosed herein. The general operation of the mixing and filtering carried out in the alternative apparatus is substantially the same as for the apparatus shown in FIGS. 1 to 3, except as otherwise described. The same reference numerals will be used to refer to the same features as shown in FIGS. 1 to 3.

The lower chamber 16 is separated into an outer wet chamber 50 that receives filtered water and a dry chamber 52 for collection of dewatered solid product by a circular inner wall 54. The wall 54 is concentric with the opening 20 in the base plate such that the plug 28 prevents water from entering the dry chamber 52 during filtration.

The dry chamber 52 includes a chute 56 that is angled downwardly towards opening 58 in the side wall of the lower chamber 16.

In use the plug 28 remains in place where it seals the dry chamber until the filtered water has been allowed to flow into the wet chamber. This apparatus may include suitable filtered water flow control devices such as valves or the like (not shown).

When the plug 28 is opened as shown in FIG. 6, the briquettes can pass into the dry chamber 52 and pass via chute 56 to the outside of the chamber 16 for collection.

The apparatus 10 includes a single hopper 60 for receiving any excess waste. The hopper 60 has an internal circular housing 61 that holds a diaphragm that is operable to apply further pressure to solid product to assist in filling the voids in the filter press plate.

In this aspect arm 30 is a shaft with an agitator 62 for mixing or assisting in mixing the waste water and selling agent. The arm 30 may also provide an inlet for waste water or diluent water that can be injected into the mixture under pressure to further facilitate mixing.

The agitator 62 is moveably mounted to arm 30 so that when the apparatus 10 is in the filtering configuration as shown in FIG. 5, the agitator 62 can slide upwards and may be housed within a recess 64 in the lower surface of the filter press plate 24.

Figure 7:
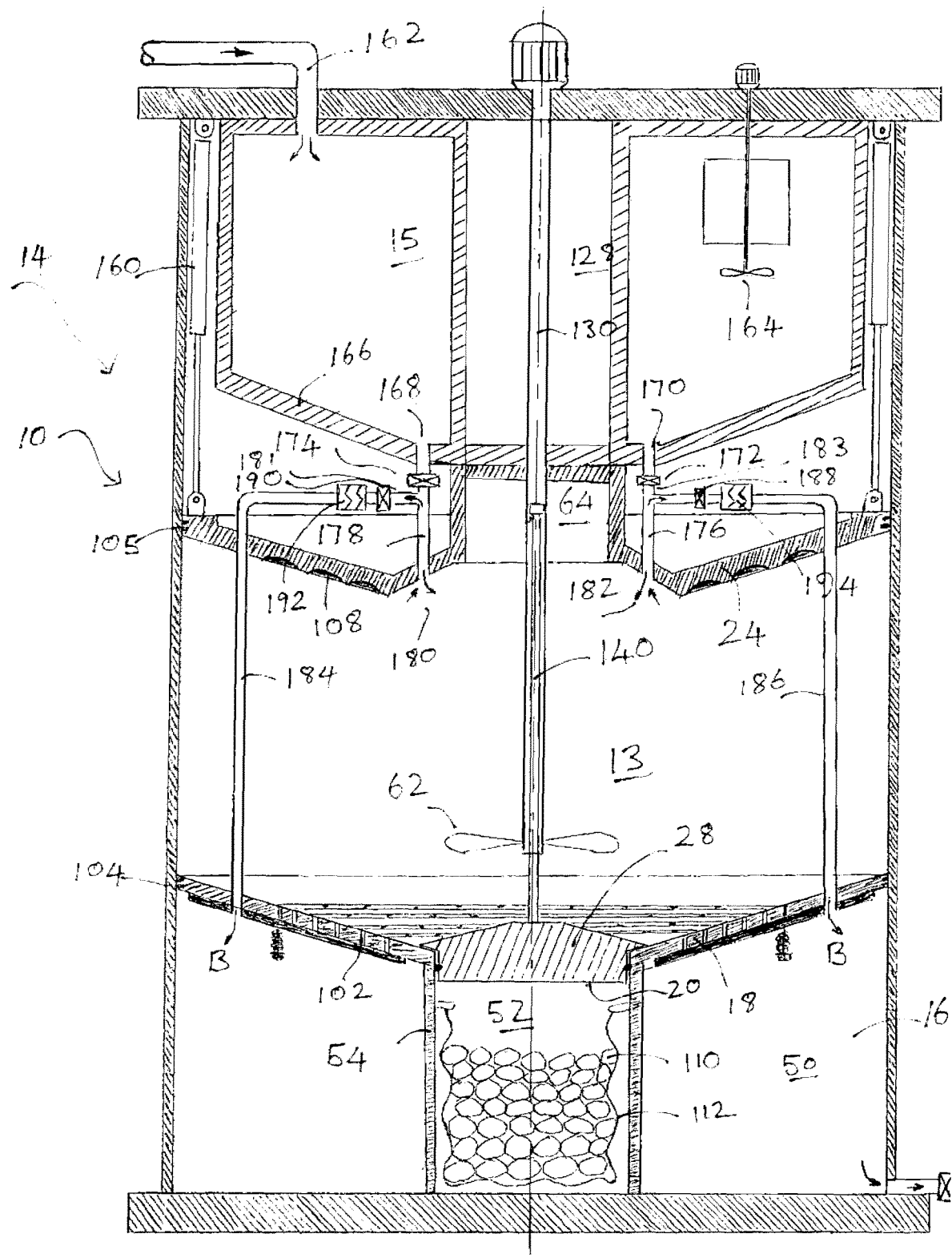
FIG. 7 is schematic cross section of an apparatus according to a further aspect of the disclosure.

FIG. 7 is a cross section schematic view of a further aspect of an apparatus as disclosed herein. The same reference numbers will be used to describe the same features as found in FIGS. 1 to 6.

The filter press plate 24 and base plate 18 are in the mixing position. The bottom surface of the filter press plate 24 has a profile defining a series of voids 108 that when in the filtering position pressed against the base plate 18, the suspended particles are compressed within the voids to produce dewatered product in the form of briquettes 110. The voids 108 are connected by relief grooves to allow for pressure equalization between the voids.

Collected briquettes 110 are schematically shown collected in a collection bag 112 in the dry collection chamber 52.

The base plate 18 has concentric rings of filter openings 102. In use, the openings 102 are covered by a fine mesh (shown in FIG. 8). The conical plug 28 is in the closed position. Immediately below and concentric with the opening 20 is wall 54 that in use separates inner dry chamber 54 from the outer wet chamber as discussed above with respect to FIGS. 4 to 6.

Two outer O rings 104 seal the base plate against the inner walls of the tank. The upper ring is inclined downwards at an angle of 45°. This aligns with a corresponding angle of an outer O ring 105 surrounding the filter press plate. This angle ensures that the briquettes fall centrally into opening 20.

The bottom of the filter press plate 24 has a central recess 64 that in use receives the agitator 62 when the filter press plate is in the filtering position.

The filter press plate 24 has voids 108 for compressing suspended particles together to for dewatered solid product in the form of briquettes.

The apparatus 10 is shown in the mixing configuration in which a mixing chamber 13 is defined between the filter press plate 24 and the base plate 18.

The upper section 14 of the apparatus in FIG. 7 has a further pre-treatment chamber 115 that is above the filtration chamber 13. The pretreatment chamber 15 has an inner chamber 128 through which drive tube 130 passes. The drive tube 130 houses a plug shaft 140. The plug shaft is engaged with the plug 28 at one end. The plug shaft 140 is operatively connected to a motor 150 for raising and lowering the plug shaft 140 and engaged plug 28.

FIG. 7 also shows hydraulic rams 160 that operate to raise and lower the filter press plate 24.

The pre-treatment chamber 15 has an inlet 162 one on side and an agitator 164 on the other side. The floor 166 of the pre-treatment chamber has two outlets 168, 170 that are controlled by valves 172, 174. The outlets 168, 170 fluidly connect the pre-treatment chamber 15 to the filtration chamber 13 via fluid lines 176, 178 to inlet/outlets 180, 182 through the filter press plate 24.

The fluid lines 176, 178 are extendible and retractable so as to accommodate the movement of the filter press plate 24 between the filtering and non-filtering positions.

In use waste water is introduced into pre-treatment chamber 15 through inlet 162. A pretreatment agent such as an acid or alkali to modify pH may be added by any suitable method known in the water processing arts. When the water has reached a desired pre-treatment value such as a desired pH range, the valves 172, 174 are actuated to release water into the filter chamber 13 through inlets 176, 178.

Each fluid line 176, 178 has a T junction 180, 182 that connects to a second fluid line 184, 186. The second fluid lines 184, 186 are controlled by pressure valves 188, 190.

In use, when the filter press plate 24 and base plate 18 are in the filtering position and water is being expelled through the holes 102 in the base plate 18, a considerable amount of pressure may be generated. Excess pressure can actuate the pressure relief valves 188, 190 to allow excess water to enter fluid lines 176, 178 and which is diverted into the second fluid lines 184, 186 through filters 192, 194 into the wet chamber 50 as indicated by arrows B.

It will also be appreciated that by selective operation of the valves, water in the pre-treatment chamber 14a can be diverted to the wet chamber 16 bypassing the filter chamber 14b. This allows water to be released from the pre-treatment chamber in the event of a malfunction. This provides a simple gravity feed solution, rather than relying on pumps and the like.

Figure 8:
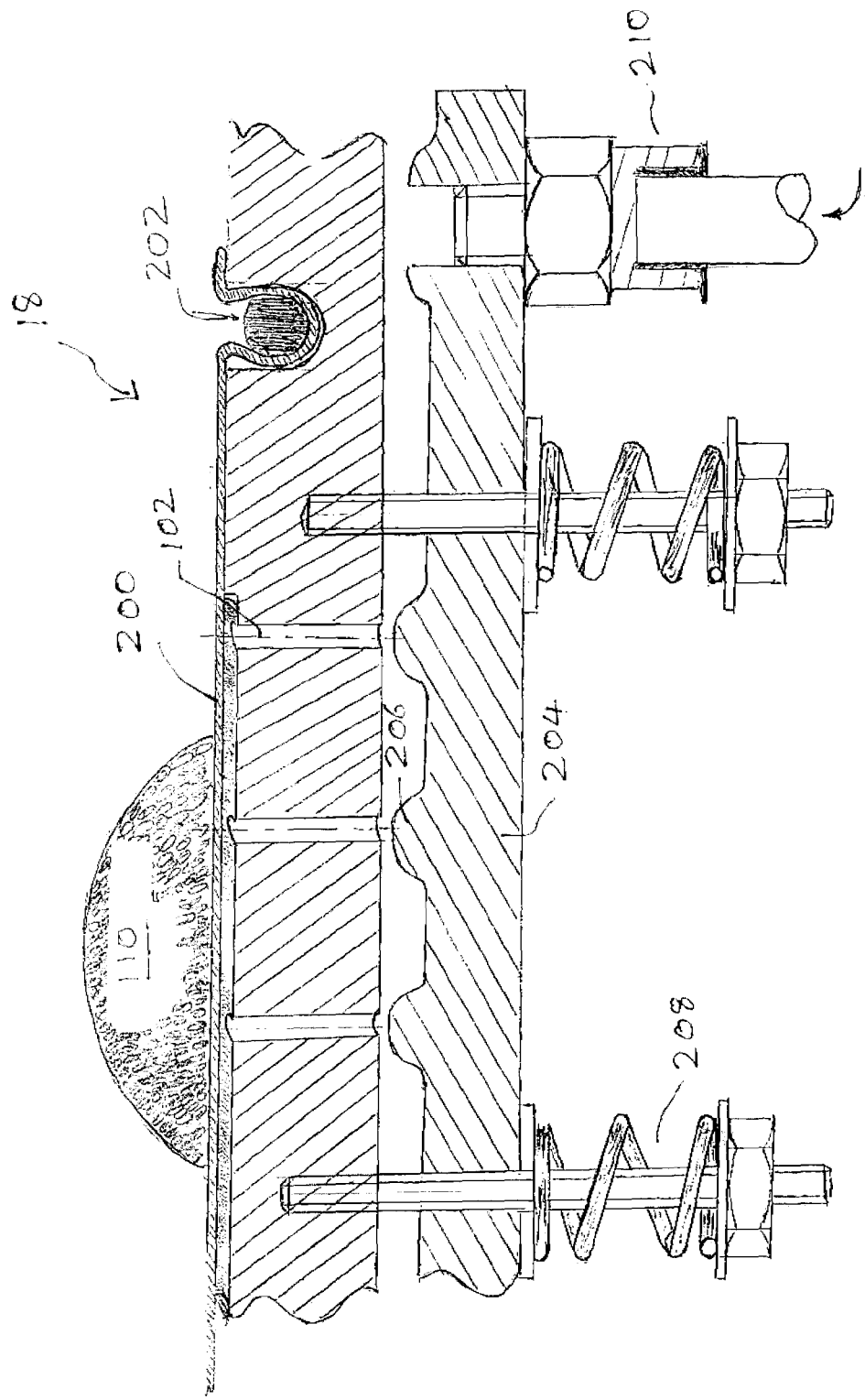
FIG. 8 is a detail of section A in FIG. 7.

FIG. 8 shows a detail of the base plate 18. A filter mesh 200 is stretched across the upper surface of the base plate 18. The filter mesh particle size may be any suitable size, depending upon the nature of the particles being separated. A suitable size is about 40 to 100 microns. The mesh 200 is held in place by a retainer clip 202.

A rubber block plate 204 is mounted below the base plate 18. The block plate 204 is moveable between a sealed position against the base plate 28 such that it blocks openings 102 during the charging and mixing of water in the filter chamber 14b. The upper surface of the block plate 204 has a profile with a series of corrugations 206 that align with openings 102 so as to facilitate sealing.

The block plate 204 is biased towards the closed position by springs 208. When in the filtering step, pressure generated by the press action between the filter press plate and the base plate overcomes the bias so as to move the block plate 204 to an open position.

A briquette 110 is shown on the surface of the base plate 18. As the base plate 18 is at an angle of about 45°, the briquettes normally slide towards the opening 20 in the base plate 28. In some instances a briquette 110 may become stuck on the surface. Should this occur, the briquettes may be dislodged with a jet of pressurized air from beneath base plate 18 and through air holes 102. An air inlet 210 is provided for this purpose.

It will be appreciated that with the disclosed assembly, substantially dewatered solid product that is suitably in briquette form may be handled and transported by conventional dry material handling equipment and vehicles. Dry material transport, handling and storage has many advantages over that of liquids such as slurries in terms of efficiency, safety, economy and environment.

The settling agent that is used in the example causes the fines to coagulate and floc together to form flocs that not only rapidly form and settle but also form flocs that are not overly porous as formed using conventional flocculants such that the floc can be quickly and efficiently dewatered by filter pressing. The present inventor is not aware of any other settling agent that has these properties when used with suspended fine particles such as those found in mineral tailings, coal tailings and other such wastes.

The apparatus as disclosed herein is a single unit that can undergo multiple steps of pretreating, mixing, filtering, briquette formation and collection, clarified water collection. Conventional processes utilize multiple piece of machinery that each action a different step. Covenantal processes also require the pumping of liquids between containers and around the treatment plant. The present apparatus allows fluid to be transferred between chambers and processes using gravity flow. This considerably reduces up front plant costs as well as avoiding costly equipment maintenance, maintenance shut downs, part replacement and the like which considerably adds to operating costs.

It is envisioned that the disclosed apparatus and method can provide an alternative to storing waste in tailing dams or ponds in terms of economy, the environment and health and safety. Additional advantages is that isolated product may be used directly such as coal fines recovered from coal tailing as coal briquettes or may be treated further to recover valuable materials contained therein. For example red mud contains aluminum as aluminum oxide, silicon dioxide, sodium oxide, titanium dioxide and iron oxide.

It will be appreciated that various changes and modifications may be made to the invention as disclosed and claimed herein without departing form the spit and scope thereof.

The invention claimed is:

1. An assembly for settling suspended waste particles from waste water and recovering the waste particles as a substantially dewatered solid product, the assembly comprising;
    a tank having an upper section for receiving waste water, a lower chamber and a base plate separating the upper section and the lower chamber, the base plate having an opening therein;
    a closure moveable between a position in which the base plate opening is closed and a position in which the base plate opening is open;
    a filter member within the upper section,
    wherein;
    the filter member and the base plate are moveable with respect to each other between a non-filtering position in which the filter member is spaced away from the base plate and a filtering position in which the filter member and base plate are pressed together with the closure in the closed position such that suspended waste particles are compressed between the filter member and the base plate to form a substantially dewatered solid product; and
    when the filter member is returned to the non-filtering position, the closure is moveable to the open position such that the substantially dewatered solid product can pass through the opening into the lower chamber for collection.

2. The apparatus of claim 1, wherein the base plate is stationary and the filter member is moveable relative to the base plate.

3. The apparatus of claim 1, wherein the lower chamber is separated into a dry chamber for receiving the substantially dewatered solid product and a wet chamber for receiving filtered water.

4. The apparatus of claim 3, wherein the dry chamber includes a collector for the substantially dewatered solid product.

5. The apparatus of claim 4, wherein the collector is a downwardly inclined chute.

6. The apparatus of claim 1, that further includes a collection unit movable between a collection position within the lower chamber when the closure is in the open position after filtration such that compressed dewatered solid product can pass into the collection unit and a recovery position in which collected product can be recovered.

7. The apparatus of claim 1, wherein the tank has a circular cross section and the opening is circular and coaxial with the base plate.

8. The apparatus of claim 7, wherein the base plate has an inverted frustoconical shape.

9. The apparatus of claim 8, wherein, the closure is in the form of a conical plug.

10. The apparatus of claim 9, wherein the shape of the filter member has an upper inverted frustoconical section complimentary to the base plate and an inner conical section that is complimentary to the upper surface of the closure.

11. The apparatus of claim 1, wherein, the lower surface of the filter member has a plurality of voids that the particles are compressed into so as to form substantially dewatered discrete solid units.

12. The apparatus of claim 1, which further comprises at least one smaller chamber or hopper mounted to the top surface of the filter member and in fluid communication with the lower surface of the filter member with a non-return valve set to a predetermined pressure for receiving excess compressed particles.

13. The apparatus of claim 1, wherein the filter member and closure are operatively connected together such that a single lifting and lowering arrangement can be used to lift and lower the filter member and closure together.

14. The apparatus of claim 1, further comprising a waste collection unit removeably connected to the closure such that in use the filter member, closure and waste collection unit can be raised and lowed together.

15. A method of recovering suspended waste particles from waste water in the form of a substantially dewatered solid product, the method comprising;
    providing a tank having an upper section for receiving waste water, a lower chamber and a base plate separating the two chambers, the base plate having an opening therein;
    a closure moveable between a position in which the base plate opening is closed and a position in which the base plate opening is open;
    a filter member within the upper section, wherein;
    the base plate and the filter member being moveable with respect to each between a non-filtering position with the filter member away from the base plate and a filtering position in which the filter member and base plate are pressed together;
    charging the upper section with the waste water with the closure in the closed position and the filter member in the non-filtering position;
    allowing the suspended particles to settle;
    moving the filter member and/or base plate into the filtering position such that the waste particles are compressed between the filter member and the base plate so as to provide a substantially dewatered solid product;
    returning the filter screen and/or base plate to the non-filtering position; and
    moving the closure into the open position so that the substantially dewatered solid product waste can pass through the opening into the lower chamber.

16. The method of claim 15, wherein a settling agent is introduced into the waste water either before and/or after the waste water is charged to the upper chamber.

17. The method of claim 15, wherein the waste particles have particle sizes of less than 300 μm, and
the waste particle comprise red mud, coal fines or fly ash.

18. The method of claim 15, wherein the settling agent comprises 43.7 wt % to 46.2 wt % of a colloidal clay, 24.1 wt % to 25.9 wt % of an inorganic coagulant, 19.2 wt % to 20.8 wt % of a water purifier ceramic powder, 4.8 wt % to 5.2 wt % of a cationic polymeric coagulant aid and 4.8 wt % to 5.2% of an inorganic coagulant aid and between 15 wt % and 25 wt % of an adsorbent silicate.

19. The method of 18, wherein the colloidal clay is bentonite, saponite, attapulgite, kaolinite or a mixture of any two or more thereof;
the inorganic coagulant is an inorganic salt of aluminium and/or iron, the adsorbent silicate is magnesium silicate ($Mg_3Si_4O_{10}(OH)_2$), magnesium aluminum silicate ($AlMgO_4Si+$), calcium silicate ($Ca_2O_4Si$), sodium silicates ($Na_2(SiO_2)_nO$), silica gel or a mixture of any two or more thereof; the cationic polymeric coagulant aid is epichlorohydrin dimethylamine, aminomethyl polyacrylamide, polyalkylene, a polyamine, a polyethyleneimine, sodium alginate, starch, chitosan, or a mixture of any two or more thereof, and the inorganic coagulant aid is $CaCO_3$.

* * * * *